No. 848,846. PATENTED APR. 2, 1907.
D. PATTERSON.
RECORDER.
APPLICATION FILED JULY 9, 1906.
2 SHEETS—SHEET 1.
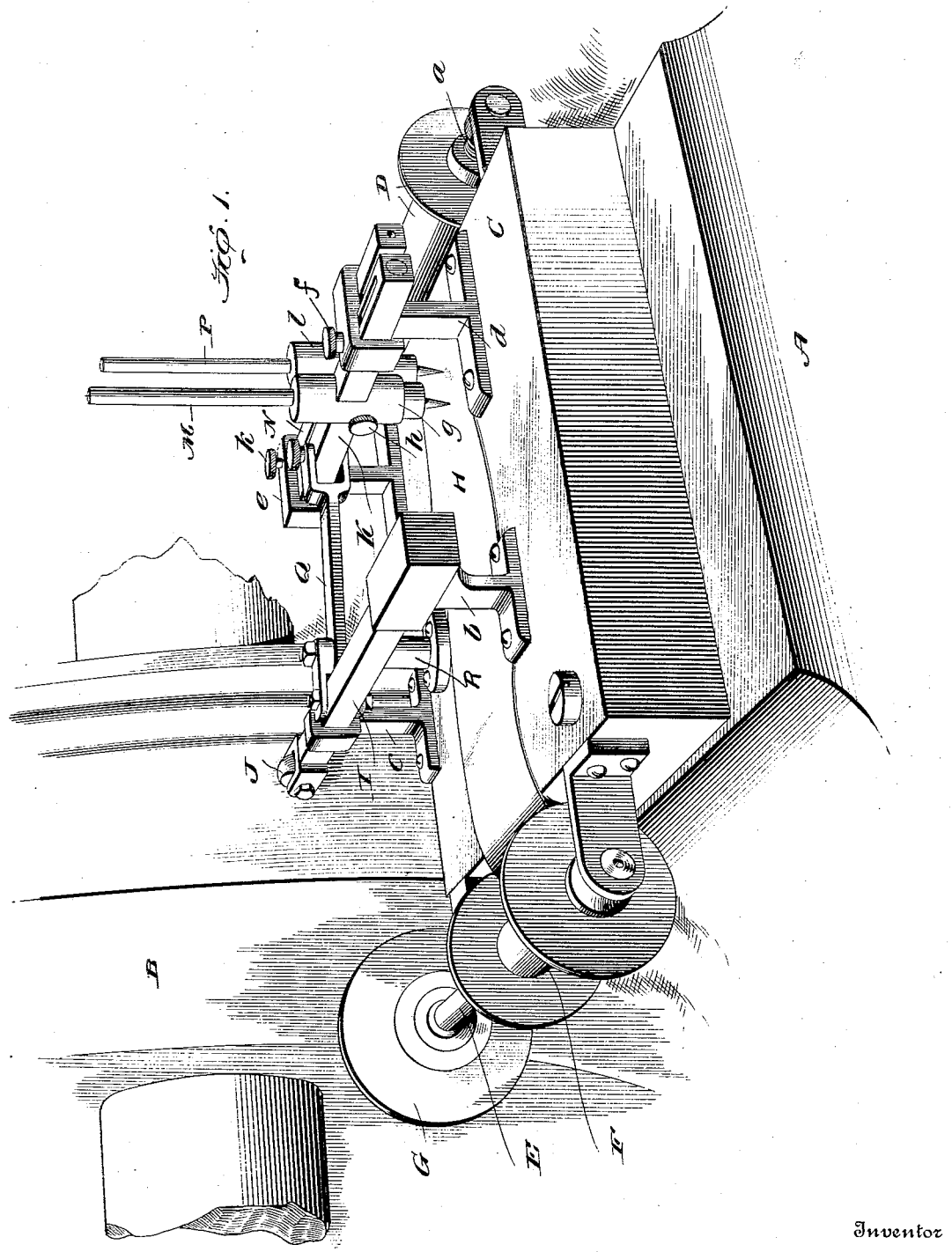
Witnesses
J. J. Sheehy Jr.
Inventor
David Patterson.
By James Sheehy
Attorney

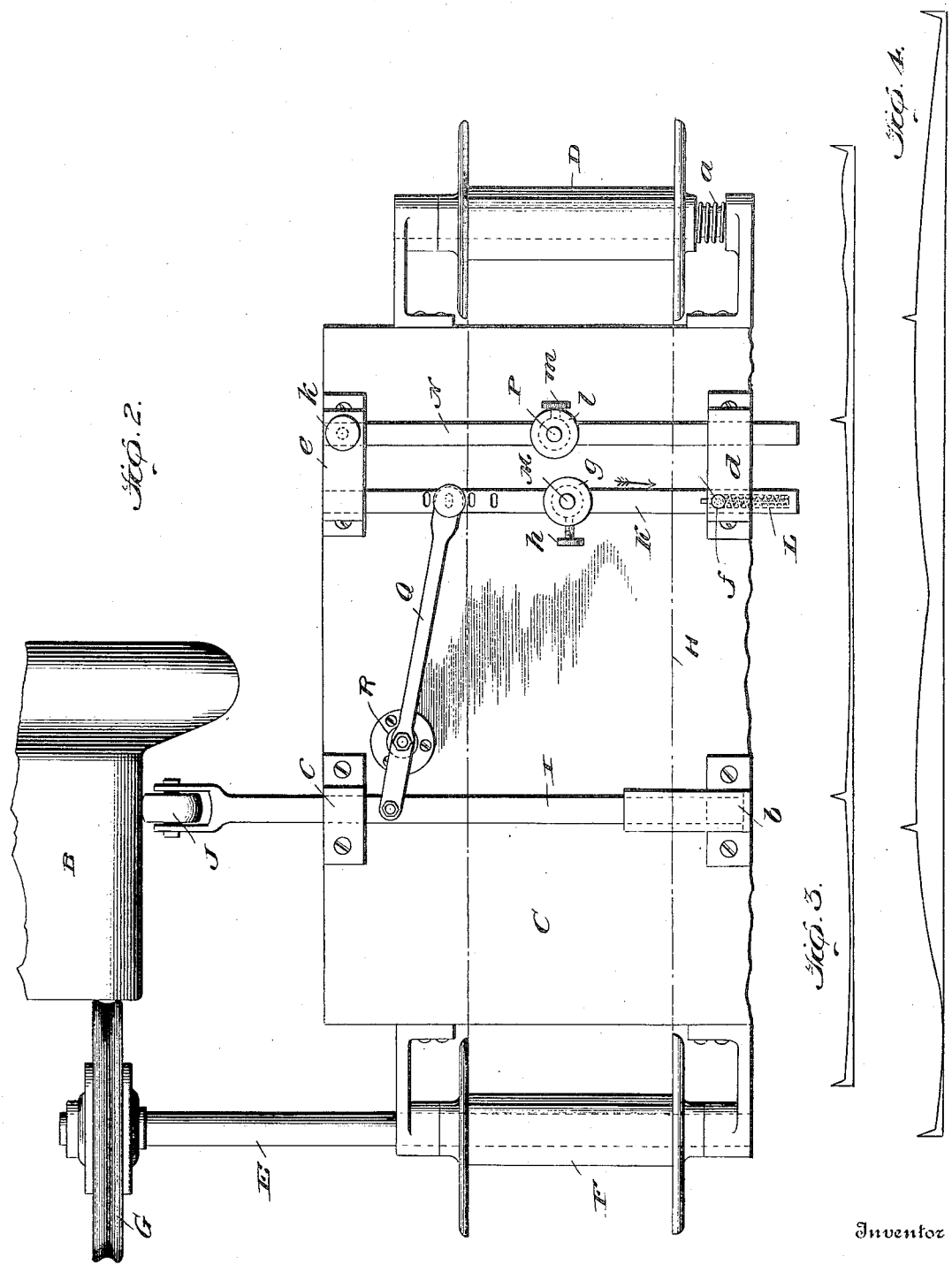

UNITED STATES PATENT OFFICE.

DAVID PATTERSON, OF DENVER, COLORADO.

RECORDER.

No. 848,846.　　　　Specification of Letters Patent.　　　　Patented April 2, 1907.

Application filed July 9, 1906. Serial No. 325,333.

*To all whom it may concern:*

Be it known that I, DAVID PATTERSON, a citizen of the United States, residing at Denver, in the city and county of Denver and State of Colorado, have invented new and useful Improvements in Recorders, of which the following is a specification.

My invention pertains to recorders; and it contemplates the provision of a device calculated to make accurate diagrams of the contour of wheel-tires, as well as the contours of cast and all other types of wheels, new or old.

The invention will be fully understood from the following description and claims, when the same are read in connection with the accompanying drawings, forming part of this specification, in which—

Figure 1 is a perspective view illustrating the device constituting the present and preferred embodiment of my invention as properly arranged relative to a wheel the contour of the tire of which is to be indicated. Fig. 2 is an enlarged plan view of the same with the base or body partly broken away and the tool-rest omitted. Figs. 3 and 4 are diagrams hereinafter referred to in detail.

Similar letters designate corresponding parts in the figures of the drawings, referring to which—

A is the tool-rest of a wheel-lathe.

B is a wheel mounted in the lathe and designed to be rotated with a view of having a record made of the contour of its tire-tread, and C is the base or body of my novel device, which is fastened to the tool-rest A by one or more screws or any other means compatible with the purpose of my invention.

In addition to the base or body C the recording device comprises a drum D, mounted at one end of the body and subjected to the pressure of a spring $a$, so as to prevent its turning too freely; a shaft E, mounted at the opposite end of body C and having fixed thereon a drum F and a wheel G, which latter is preferably of rubber and is arranged against the side of the wheel B so as to take motion therefrom; a ribbon H, preferably of paper, wound upon the drum D, passed over the upper side of the body C and designed to be fastened to and taken up on the drum F; a movable device, preferably a thrust-rod I, mounted in fixed guide-standards $b$ and $c$ and having at one end a wheel J, preferably of steel, arranged against the tire-tread of wheel B; a reciprocatory rod K, mounted in fixed guide-standards $d$ and $e$ and arranged to move parallel to the thrust-rod I; a spring L, interposed between an abutment $f$ on guide-standard $d$ and the rear portion of the rod K and tending to press said rod in the direction indicated by arrow in Fig. 2; a marker M, preferably a pencil, suitably connected to the rod K, as through the medium of the sleeve $g$ and set-screw $h$; a rod N, adjustably fixed by a set-screw $k$ in the guide-standards $e$ and $d$ and arranged parallel to the reciprocatory rod K; a marker P, preferably a pencil, connected to the rod N, as through the medium of the sleeve $l$ and the set-screw $m$, and a horizontally-swinging lever Q, preferably a one-to-four lever, fulcrumed on a fixed post R and having its short arm connected to the thrust-rod I and its long arm connected to the reciprocatory rod K.

It will be apparent from the foregoing that the spring L by tending to move the rod K in the direction indicated by arrow in Fig. 2 will hold the wheel J under yielding pressure against the tire-tread of the wheel B.

The office of the marker P is to make a rigid or straight line on the ribbon H, while the marker M has for its function to record on the ribbon the shape or contour of the circumference of the tire-tread, which shape may be readily compared with the said rigid or straight line.

It will be understood from the foregoing that the rod I will derive motion from variations in the tire-tread of wheel B and that such motion will be transmitted through lever Q to the rod K, so as to assure the marker M serving the purpose ascribed to it.

When my novel device is employed to make a diagram, such as shown in Fig. 3 or Fig. 4, of the tire-tread of a locomotive drive-wheel, the diagram will show the contour of the worn surface of the wheel-circumference and indicate the high and low places in correct relation to the crank-pins and counter-balances, will indicate whether the counterbalance is too light or too heavy and whether in the right position, and will also indicate the flat wear due to quarter-slip or improper setting of valves and locate the flat places due to imperfection of tire material and show the extent of same.

In the diagram Fig. 3 the location of the crank-pin is marked by one point upward of the contour line, and the flattening due to wearing of the tire near the ends of the wheel-counterweight are indicated by two similar points. It will be noted that the diagram shows a very well-balanced wheel, as indicated by nearly-even wear.

In the diagram Fig. 4 the device has shown that the counterweight of the particular wheel from which the diagram was made was very much too light and that the most-worn part of the tire was at a point about eight inches ahead of the crank-pin and extending in an almost equal amount of wear at a point eight inches behind the crank-pin and that the low place in this case was five thirty-seconds of an inch below the highest point on the tire-tread, the diagram being taken from a main driving-wheel of a narrow-gage engine.

The construction of recording device shown and described constitutes the present and preferred embodiment of my invention; but it is obvious that in practice such changes or modifications may be made as fairly fall within the scope of my claims without departing from the spirit of my invention.

Having described my invention, what I claim, and desire to secure by Letters Patent, is—

1. A recorder for the purpose described, comprising a body, a device carried by the body and arranged to be moved by variations in the tire-tread of a wheel, at an angle to said tread, a marker connected and movable with said movable device, and means, also carried by the body, for moving means designed to receive the marking; the said means for moving the marking-receiving means having a wheel disposed at an angle to the direction of movement of the before-mentioned movable device and arranged to engage the side of the first-mentioned wheel and derive motion therefrom.

2. A recorder for the purpose described, comprising a body, a device carried by the body and arranged to be moved by variations in the tire-tread of a wheel, at an angle to said tread, a marker connected and movable with said movable device, a drum mounted on the body and arranged to rotate at an angle to the direction of movement of the movable device, and a second drum similarly mounted on the body and having a wheel disposed at an angle to the direction of movement of the movable device and arranged to engage a side of the before-mentioned wheel, said drum being designed to carry a ribbon arranged to receive the marking and also arranged to be fed off one of the said drums and on the other.

3. A recorder for the purpose described, comprising a body, a thrust-rod carried by the body and arranged to be moved endwise by variations in the tire-tread of a wheel, at an angle to said tread, a bar carried by the body and movable parallel to the thrust-bar, a lever fulcrumed at an intermediate point of its length and connecting the said bars, a marker carried by the second-mentioned bar, means for holding the thrust-bar under yielding pressure against a tire-tread, a drum mounted on the body and arranged to rotate at an angle to the direction of movement of the thrust-bar, and a second drum similarly mounted on the body and having a wheel disposed at an angle to the direction of movement of the movable device and arranged to engage a side of the before-mentioned wheel, said drums being designed to carry a ribbon arranged to receive the marking and also arranged to be fed off one of the drums and on the other.

4. A recorder for the purpose described, comprising a body, a thrust-rod carried by the body and arranged to be moved endwise by variations in the tire-tread of a wheel, at an angle to said tread, a bar carried by the body and movable parallel to the thrust-bar, a lever fulcrumed at an intermediate point of its length and connecting the said bars, a marker carried by the second-mentioned bar, means for holding the thrust-bar under yielding pressure against a tire-tread, a drum mounted on the body and arranged to rotate at an angle to the direction of movement of the thrust-bar, a second drum similarly mounted on the body and having a wheel disposed at an angle to the direction of movement of the movable device and arranged to engage a side of the before-mentioned wheel, said drums being designed to carry a ribbon arranged to receive markings and also arranged to be fed off one of the drums and on the other, a bar held against movement on the body, and a marker carried by the latter bar.

In testimony whereof I have hereunto set my hand in presence of two subscribing witnesses.

DAVID PATTERSON.

Witnesses:
H. C. VAN BUSKIRK,
E. E. WHITTED.